(12) United States Patent
Heo et al.

(10) Patent No.: US 9,418,058 B2
(45) Date of Patent: Aug. 16, 2016

(54) PROCESSING METHOD FOR SOCIAL MEDIA ISSUE AND SERVER DEVICE SUPPORTING THE SAME

(71) Applicant: Electronics and Telecommunications Research Institute, Daejeon (KR)

(72) Inventors: Jeong Heo, Daejeon (KR); Hyun Ki Kim, Daejeon (KR); Sang Kyu Park, Daejeon (KR); Soo Jong Lim, Daejeon (KR); Yoon Jae Choi, Daejeon (KR); Mi Ran Choi, Daejeon (KR); Pum Mo Ryu, Daejeon (KR); Yong Jin Bae, Daejeon (KR); Yeo Chan Yoon, Daejeon (KR); Myung Gil Jang, Daejeon (KR); Chung Hee Lee, Daejeon (KR); Yo Han Jo, Daejeon (KR); Hyo Jung Oh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 225 days.

(21) Appl. No.: 14/256,078

(22) Filed: Apr. 18, 2014

(65) Prior Publication Data
US 2015/0178267 A1 Jun. 25, 2015

(30) Foreign Application Priority Data
Dec. 19, 2013 (KR) .................. 10-2013-0158866

(51) Int. Cl.
G06F 17/30 (2006.01)
G06F 17/27 (2006.01)
H04L 12/58 (2006.01)

(52) U.S. Cl.
CPC .......... *G06F 17/278* (2013.01); *G06F 17/2785* (2013.01); *G06F 17/30654* (2013.01); *G06F 17/30684* (2013.01); *H04L 51/32* (2013.01)

(58) Field of Classification Search
USPC .................................. 707/722, 723, 706, 738
See application file for complete search history.

(56) References Cited

U.S. PATENT DOCUMENTS

| 8,612,208 | B2* | 12/2013 | Cooper | ............. G06F 17/30672 704/9 |
| 2011/0125734 | A1* | 5/2011 | Duboue | ................... G09B 7/00 707/723 |
| 2012/0095978 | A1* | 4/2012 | Levin | ..................... G06Q 30/02 707/706 |
| 2015/0032751 | A1* | 1/2015 | Ting | .................. G06F 17/30598 707/738 |

\* cited by examiner

*Primary Examiner* — Hung T Vy
(74) *Attorney, Agent, or Firm* — William Park & Associates Ltd.

(57) ABSTRACT

The present invention relates to a social media question and answer service, and discloses a social media issue processing device and method. The method includes a question analyzing unit which analyzes a question type of an input question through a question pattern dictionary which is stored in advance; a social media analyzing unit which performs issue period recognition for the question, question type based analysis, question based summary creation, and question based reliability calculation; and a report creating unit which creates a summary in accordance with at least one of correlation between the question type and the question based summary, correlation between the issue period and the question type based analysis result, and correlation between the reliability and the question based summary.

15 Claims, 21 Drawing Sheets

FIG. 2

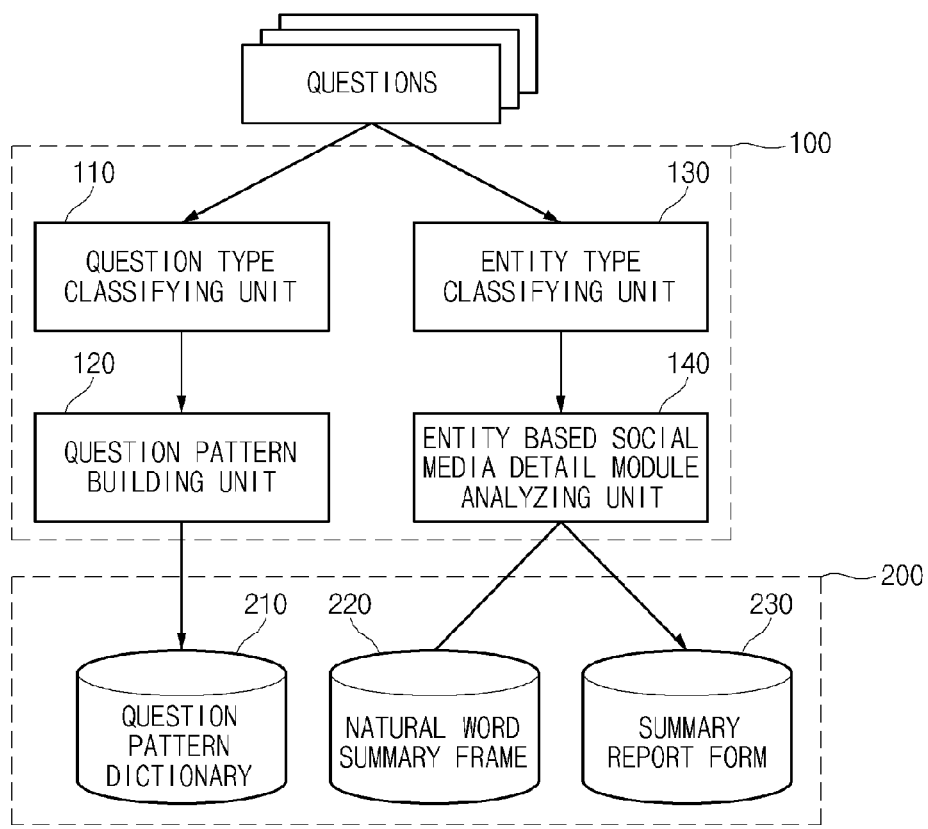

FIG. 3

| QUESTION TYPE | EXAMPLE QUESTION | ENTITY | RESULT TYPE |
|---|---|---|---|
| SINGLE ENTITY - ANALYSIS DESIGNATION TYPE | HOW'S BUZZ PROGRESS OF SAMSUNG ELECTRONICS? | SAMSUNG ELECTRONICS | BUZZ PROGRESS RESULT |
| SINGLE ENTITY- REPORT CREATION TYPE | SAMSUNG ELECTRONICS | SAMSUNG ELECTRONICS | SUMMARY REPORT |
| PLURAL ENTITIES- ANALYSIS DESIGNATION TYPE | LET ME KNOW PROGRESS OF EMOTIONAL CHANGES OF APPLE AND SAMSUNG ELECTRONICS | APPLE, SAMSUNG ELECTRONICS | EMOTIONAL TIME SERIES |
| PLURAL ENTITIES- REPORT CREATION TYPE | COMPARE APPLE AND SAMSUNG ELECTRONICS | APPLE, SAMSUNG ELECTRONICS | COMPARISON SUMMARY REPORT |

FIG. 4

- MAJOR ISSUE RELATED WITH KEYWORD IS AS FOLLOWS
  - [ISSUE 1] StartDate1-EndDate1: IssueLabel1  ~401
  - [ISSUE 2] StartDate2-EndDate2: IssueLabel2

- MAJOR ISSUE RELATED WITH SAMSUNG ELECTRONICS IS AS FOLLOWS
  - [ISSUE 1] 20130811-20130817: SAMSUNG VIOLATES LABOR LAW IN BRAZIL  ~401
  - [ISSUE 2] 20130826-20130901: SAMSUNG LAUNCHES GALAXY NX

FIG. 5

| ENTITY TYPE | SOCIAL MEDIA ANALYSIS RESULT TO BE PRESENTED |
|---|---|
| PERSON | BUZZ PROGRESS ANALYSIS, EMOTIONAL TIME SERIES ANALYSIS, DETAIL EMOTIONAL ANALYSIS, ASSOCIATIVE KEYWORD ANALYSIS, COMPETITIVE KEYWORD ANALYSIS |
| PRODUCT | BUZZ PROGRESS ANALYSIS, EMOTIONAL TIME SERIES ANALYSIS, ATTRIBUTE EMOTIONAL ANALYSIS, EMOTIONAL CAUSE ANALYSIS, INFLUENCER ANALYSIS, ISSUE EVENT |
| ... | ... |

| | SAMSUNG ELECTRONICS & APPLE | | | SAMSUNG ELECTRONICS | DETAIL ANALYSIS | | | APPLE | DETAIL ANALYSIS | |
|---|---|---|---|---|---|---|---|---|---|---|
| | TOTAL | | | TOTAL | MOVE TO SOCIAL WISDOM (PRESENT SAMSUNG ELECTRONICS RESULT) | | | TOTAL | MOVE TO SOCIAL WISDOM (PRESENT "APPLE" RESULT) | |
| RANKING | KEYWORD | | RANKING | | | | | | | |
| 1 | LG ELECTRONICS | (+) | 1 | APPLE | (+) | | 1 | SAMSUNG ELECTRONICS | (+) | |
| 2 | LG | (+) | 2 | ITC | (+) | | 2 | SAMSUNG GROUP | (+) | |
| 3 | PANTECH SUBSIDIARY | (+) | 3 | LG ELECTRONICS | (+) | | 3 | ITC | (+) | |
| 4 | POSCO | (+) | 4 | HYUNDAI MOBIS | (+) | | 4 | GOOGLE | (+) | |
| 5 | HYUNDAI HEAVY INDUSTRIES | (+) | 5 | PANTECH SUBSIDIARY | (+) | | 5 | LG ELECTRONICS | (+) | |
| 6 | T-WORLD | (+) | 6 | LG U PLUS | (+) | | 6 | LENOVO | (+) | |
| 7 | LOTTE SHOPPING | (+) | 7 | KEPCO | (+) | | 7 | LGD | (+) | |
| 8 | KIA MOTORS | (+) | 8 | TEXAS INSTRUMENT | (+) | | 8 | KOREA INVESTMENT CO., LTD. | (+) | |
| 9 | | | 9 | ASUS | (+) | | 9 | FOSS PATENTS | (+) | |
| 10 | | | 10 | SONY | (+) | | 10 | PANTECH SUBSIDIARY | (+) | |

SUMMARY OF COMPETITIVE KEYWORD
- COMMON COMPETITIVE STATUS PER MEDIA OF SAMSUNG ELECTRONICS AND APPLE
  - NEWS: PANTECH, LG ELECTRONICS, MICROSOFT
  - BLOG: PANTECH, NOKIA, SK TELECOM
  - TWITTER: LG ELECTRONICS, SK TELECOM, PANTECH
- SUDDENLY RISING/DROPPING KEYWORD AMONG COMMON COMPETITIVE PARTIES OF SAMSUNG ELECTRONICS AND APPLE
  - SUDDENLY RISING: HYUNDAI HEAVY INDUSTRIES
  - SUDDENLY DROPPING: NOKIA, RENOVO
- SUDDENLY RISING KEYWORD: DETAIL INFORMATION OF HYUNDAI HEAVY INDUSTRIES
  - OCCURRENCE TIMING: ONE CASE ON AUGUST 11; 28 CASES ON AUGUST 14, 30 CASES ON AUGUST 15, ONE CASE ON AUGUST 17
- SUDDENLY DROPPING KEYWORD: DETAIL INFORMATION OF NOKIA
  - OCCURRENCE TIMING: 12 CASES ON AUGUST 10, 14 CASES ON AUGUST 11, TWO CASES ON AUGUST 12

PROCESSING METHOD FOR SOCIAL MEDIA ISSUE AND SERVER DEVICE SUPPORTING THE SAME

CROSS-REFERENCE TO RELATED APPLICATIONS

This application claims priority to and the benefit of Korean Patent Application No. 10-2013-0158866 filed in the Korean Intellectual Property Office on Dec. 19, 2013, the entire contents of which are incorporated herein by reference.

TECHNICAL FIELD

The present invention relates to a social media issue processing and more particularly to a processing method for a social media issue which automatically summarizes and provides individual analysis results based on correlation for an analysis result of a type based user question analysis result in information searching for a social media analysis result and a device of supporting the same.

BACKGROUND ART

As a mobile device and social media are vitalized in the related art, a huge number of social media data is flooding the Internet. The social media connotes a flow of a social public opinion so that various data analyses including a web trend analysis and a business intelligence (BI) and studies on social media in an information extracting field are actively being performed.

Till now, a core of the social media analysis systems is mostly an analysis of buzz progress information based on frequency information of a specific entity which is included in a keyword search word and emotional information of a sentence including the corresponding entity. Further, the individual analysis results are independent so that it is difficult to understand correlation and insight between analyzed results. Only search words which are input by users and a period to be analyzed are common between the individual analysis results.

In order to understand the insight for a specific entity using social media analysis systems of the related art, individual analysis results are independently analyzed and information on the correlation between the results is analyzed and summarized by a data analysis expert to create a report.

That is, subjectivity of an expert who performs analysis is highly likely to be reflected. This does not satisfy a demand of a user who wants to quickly analyze social media for a specific entity to understand an objective insight. Further, a report which is created by an expert suggests only a partial deflected viewpoint among various analysis viewpoints. This may not provide an insight which is obtained by understanding the analysis result from various viewpoints. That is, in order to perform analysis from various viewpoints which are demanded by individual users and understand the insight, interaction with the users is required.

SUMMARY OF THE INVENTION

The present invention has been made in an effort to provide a processing method of a social media issue which objectifies and provides various individual analysis results which are suggested by a social media analysis based on a predetermined type of correlations and summarizes the analysis results to create one report to understand a main insight which satisfies a demand of the user and a device of supporting the same.

An exemplary embodiment of the present invention provides a social media issue processing device, including: a question analyzing unit which analyzes a question type of an input question through a question pattern dictionary which is stored in advance; a social media analyzing unit which performs issue period recognition for the question, question type based analysis, question based summary creation, and question based reliability calculation; and a report creating unit which creates a summary in accordance with at least one of correlation between the question type and the question based summary, correlation between the issue period and a question type based analysis result, and correlation between the reliability and the question based summary.

The device may further include a resource DB which stores the question pattern dictionary, a natural word summary frame, and a summary report form; and a resource building unit which analyzes at least one of the questions which are collected in advance to build at least one of the question pattern dictionary, the natural word summary frame, and the summary report form.

The resource building unit may include: a question type classifying unit which classifies a question type in the questions which are collected in advance; and a question pattern building unit which detects a predetermined pattern from the classified question type.

The resource building unit may include: a question type classifying unit which classifies a question type in the questions which are collected in advance; and an entity based social media detail module analyzing unit which analyzes a characteristic in the entity based social media for the classified entity type.

The question analyzing unit may include: a language analyzing module which analyzes a morpheme of the input question and recognizes an entity name; an entity recognizing module which recognizes a major entity from the result which is analyzed by the language analyzing module based on the question pattern dictionary; a question type clue recognizing module which recognizes a clue word of the question based on the question pattern dictionary; and a question type determining module which determines a question type based on the number of entities and the clue word.

The social media analyzing unit may include: an association/competition analyzing unit which analyzes an associative word and a competitive word for the question type which is analyzed by the question analyzing unit; an issue processing unit which performs an issue period related analysis; and an individual social media analyzing module which compares and analyzes entities ranked by a predetermined level during the issue period.

The issue processing unit may include: an issue time recognizing module which recognizes an issue period based on an entity based buzz progress; a buzz progress graph comparing module which compares issue periods which are recognized in a plurality of entities; an issue period combining module which combines overlapping issue periods of the entities; and an issue labeling module which creates an issue label for the issue periods of entities to be compared.

The report creating unit may include: a reliability based correlation analyzing module which analyzes the correlation using the reliability value; a summary report form creating module which selects any one of the summary report forms which are predefined in accordance with the question type and recreates a summary report form in accordance with the reliability value; a natural word summary creating module which creates a natural word summary based on correlation of the individual social media analysis results which are presented in the summary report; and a summary report creating module which creates a summary report by writing a result of the question analyzing unit, the individual social media analysis result, and the natural word summary in the summary report form.

The device may further include a display module or an input module which supports an input function to request at least one of the issue period selection and the question analysis result correction.

Another exemplary embodiment of the present invention provides a social media issue processing method, including: an inputting step of receiving a question; a step of determining a question type of the input question through a question pattern dictionary which is stored in advance; an analyzing step of performing issue period recognition for the question, question type based analysis, question based summary creation, and question based reliability calculation; and a summarizing step of creating a summary in accordance with at least one of correlation between the question type and the question based summary, correlation between the issue period and a question type based analysis result, and correlation between the reliability and the question based summary.

As described above, according to the social media issue processing method and a device of supporting the same, the present invention may provide a more objective insight by applying correlation between the type of the question and the question based summary, correlation of the issue period based on buzz progress analysis and individual analysis results, and correlation between reliability of the individual analysis results and the question based summary.

The present invention may automatically create a summary report based on the correlation between the question type, the reliability of the individual analysis result and the issue period.

The present invention may receive a demand on the analysis result for the social media by a natural word question from a user and analyze the question to present a summary report which satisfies the demand of the user as a result.

The present invention may understand a similar pattern between entities from the buzz progress graph to automatically compare the individual social media analysis results and present the results with a natural word summary so as to provide an insight for the correlation between the entities.

The present invention may rank and present the issue periods which show the similar patterns and the issue periods of the individual entities together with the buzz analysis graph of the entities and provide a more convenient user interface so as to understand the insight for the correlation between the entities through social media detail analysis by a zoom-in method when the user selects the issue period.

The present invention may understand the issue period for the individual entities and automatically create and attach an issue label for the issue period to provide an issue summary based on a time line.

BRIEF DESCRIPTION OF THE DRAWINGS

FIG. 2 is a view illustrating a configuration of a resource building unit related with social media issue processing according to an exemplary embodiment of the present invention in more detail.

FIG. 3 is a view illustrating an example of a type of question which is applied to a question type classifying unit according to an exemplary embodiment of the present invention.

FIG. 4 is a view illustrating an example of a natural word summarizing frame DB for buzz progress analysis according to an exemplary embodiment of the present invention.

FIG. 5 is a view illustrating an example of a summary report form according to an exemplary embodiment of the present invention.

FIGS. 14A to 14I are views illustrating a screen interface of detail analysis results of individual social media according to an exemplary embodiment of the present invention.

Figure 1:
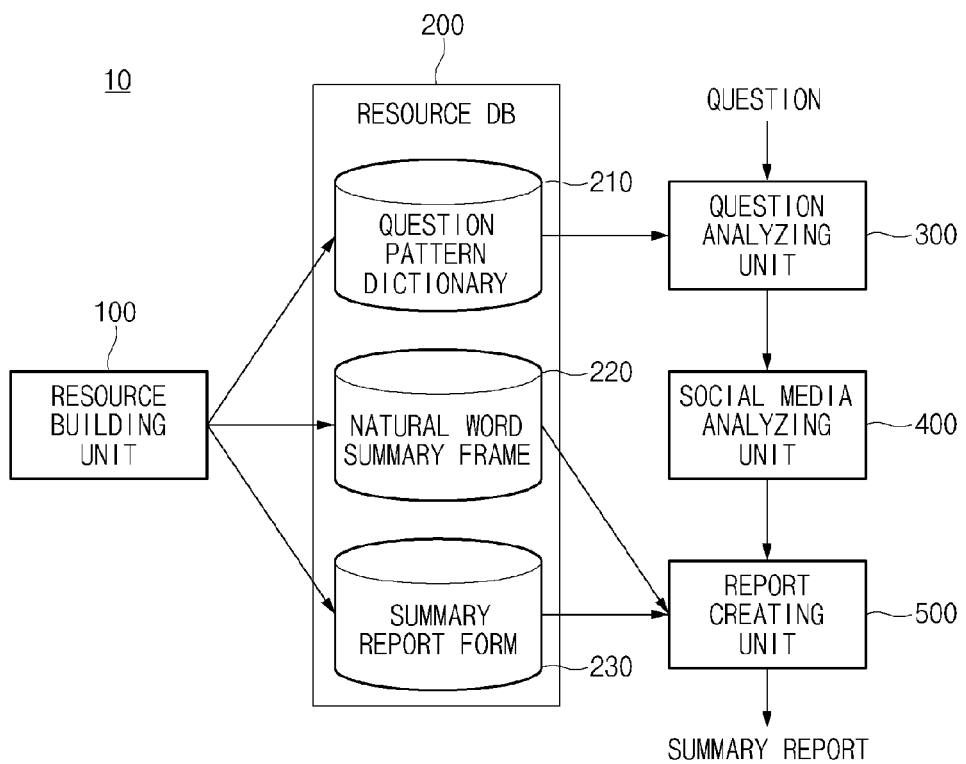
FIG. 1 is a view illustrating a configuration of a social media issue processing device according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, various exemplary embodiments of the present invention will be described in detail with reference to the accompanying drawings. In this case, it should be noted that like components are denoted by like reference numerals in the accompanying drawings. Further, when it is determined that a detailed description of related publicly known functions and configurations may obscure the gist of the present invention, the detailed description thereof will be omitted. In other words, it should be noted that only parts required to understand an operation according to the exemplary embodiment of the present invention will be described below and a description of other parts will be omitted so as not to cloud the gist of the present invention.

FIG. 1 is a view illustrating a configuration of a social media issue processing device according to an exemplary embodiment of the present invention.

Referring to FIG. 1, a social media issue processing device 10 according to an exemplary embodiment of the present invention may include a resource building unit 100, a resource DB 200, a question analyzing unit 300, a social media analyzing unit 400, and a report creating unit 500.

The resource building unit 100 may classify a question type and build a question pattern to build a question pattern dictionary DB 210. The resource building unit 100 provides a result of classifying the question type and building the question pattern to the resource DB 200. Further, the resource building unit 100 may classify an entity type and analyze a detail module of the entity based social media to provide the results to the resource DB 200 which includes a natural word summary frame DB 220 and a summary report form DB 230.

The resource DB 200 may store a question pattern dictionary which detected from a plurality of input or collected questions by the resource building unit 100, a natural word summary frame, and a summary report form. The resource DB 200 may provide the question pattern result to the question analyzing unit 300. Further, the resource DB 200 may provide the natural word summary frame and the summary report form to the report creating unit 500.

The question analyzing unit 300 may analyze an input question based on information which is stored in the question pattern dictionary DB 210 of the resource DB 200. The question analyzing unit 300 may transmit the input question analysis result to the social media analyzing unit 400. Such a question analyzing unit 300 may perform language analysis, entity recognition, question type clue recognition, and question type determination. A detailed configuration and a role of the question analyzing unit 300 will be described in more detail with reference to FIG. 6.

The social media analyzing unit 400 may perform various social media analysis on the question analysis result which is transmitted by the question analyzing unit 300. For example, the social media analyzing unit 400 may perform associative word/competitive word analysis, issue processing, and individual social media analyses. The social media analyzing unit 400 may perform a question type based analysis, a question based summary analysis, and a question based reliability analysis and transmit the result thereof to the report creating unit 500.

The report creating unit 500 may automatically create or support the summary report based on the analysis result which is provided by the social media analyzing unit 400. The summary report which is created by the report creating unit 500 may be output to an output device or transmitted to other electronic apparatuses.

The above-described social media issue processing device 10 according to the exemplary embodiment of the present invention may be implemented by an issue processing related server device or may be an electronic apparatus which may be accessible to a server device in which issue information is stored. Therefore, a device through which the analysis result or the summary report is created may be at least one of a server device and a client device. Accordingly, when the analysis result and the summary report are created in the server device, the analysis result and the summary report may be transmitted to the electronic apparatus to be output through a display module of the electronic apparatus.

FIG. 2 is a view illustrating a configuration of a resource building unit 100 related with social media issue processing according to an exemplary embodiment of the present invention in more detail.

Referring to FIG. 2, the resource building unit 100 may include a question type classifying unit 110, a question pattern building unit 120, an entity type classifying unit 130, and an entity based social media detail module analyzing unit 140.

Such a resource building unit 100 may store results in accordance with operations of the configurations in the resource DB 200. Accordingly, the resource DB 200 may build a question pattern dictionary 210, a natural word summary frame DB 220, and a summary report form DB 230 resource.

The question type classifying unit 110 may analyze the questions to classify the questions in accordance with the types of questions. The question type is classified into a single entity question and a plural entity question in accordance with the number of entities which are included in the question and classified into an analysis designation type and a report creation type depending on whether to include a clue word which designates an analysis target detail module in the question.

FIG. 3 is a view illustrating an example of a type of question which is applied to a question type classifying unit 110 according to an exemplary embodiment of the present invention.

Referring to FIG. 3, the question type classifying unit 110 may classify an example question in accordance with the question type, a recognized entity, and a result type. In the case of the single entity question, the question type classifying unit 110 recognizes an entity which is the most associated with a single entity which is input through an associative word and a competitive word and compares two entities in individual social media analysis. As a result, the question type classifying unit 110 may classify questions which are collected in accordance with a predetermined rule which is defined in advance by question types. In the meantime, during a classifying process by each question type, a specific user may manually analyze the collected questions to input corresponding analyzed results including question types to a device.

The question pattern building unit 120 may generate a lexico-semantic pattern based on a regular expression by each question type to build the question pattern dictionary DB 210. In this case, the question pattern building unit 120 may analyze the question patterns of the question types which are classified by the question type classifying unit 110 and build the question pattern dictionary DB 210 based on the results.

The entity type classifying unit 130 classifies the entity which is recognized in the question into categories such as a person, an organization, a product, and a policy. The entity based social media detail analyzing modules of 140 analyze a characteristic of an analysis target entity in the social media for every entity in accordance with the type of analysis target entity. Here, various characteristics such as an emotional cause, emotional time series, a detail emotion, an issue event, or an influencer may be defined as the characteristic. The entity based social media detail analyzing modules may be specialized by the entity type or may have different levels of importances. For example, emotional cause analysis may be comparatively specialized for a product entity. Further, importance of the emotional time series analysis result may be larger than other analysis results in the organization entity and the product entity. As described above, importance of the detail module of the social media analysis may vary depending on the type of the entity. The difference in the importance is connected with the creation of the summary of the entire report. In order to reflect this, the entity based social media detail module analyzing unit 140 may build a natural word summary frame DB 220 and a summary report form DB 230 in accordance with a predetermined condition.

FIG. 4 is a view illustrating an example of a natural word summarizing frame DB 220 for buzz progress analysis according to an exemplary embodiment of the present invention.

In FIG. 4, a designated area 401 is a variable. The resource building unit 100 may put an analyzed result value in the variable to create a natural word summary. The summary report form DB 230 may store predefined forms in order to vary a type of report which is suggested depending on the question type and an entity category. The predefined form which is stored in the summary report form DB 230 may mean how to arrange the social media detail analysis result to create the report.

FIG. 5 is a view illustrating an example of a summary report form according to an exemplary embodiment of the present invention.

Referring to FIG. 5, when the entity type is a person and a product, the social media issue processing device 10 may provide a list of detail analysis results of a social media which may be presented in a report as a list. In this case, the social media issue processing device 10 may further include a display module to output the list. Alternatively, the social media issue processing device 10 may include a communication module which may transmit the list to other electronic apparatuses. The social media issue processing device 10 according to the exemplary embodiment of the present invention may be a server device which may provide a result in accordance with a question and answer or an electronic apparatus which accesses at least one server device which is connected to a social media network to input a question and receives a result in accordance with the question to output the result. An order of lists is an order of detail analysis results to be presented in the report. A screen interface for other issue questions and answers will be described with reference to FIGS. 9 and 10.

Figure 6:
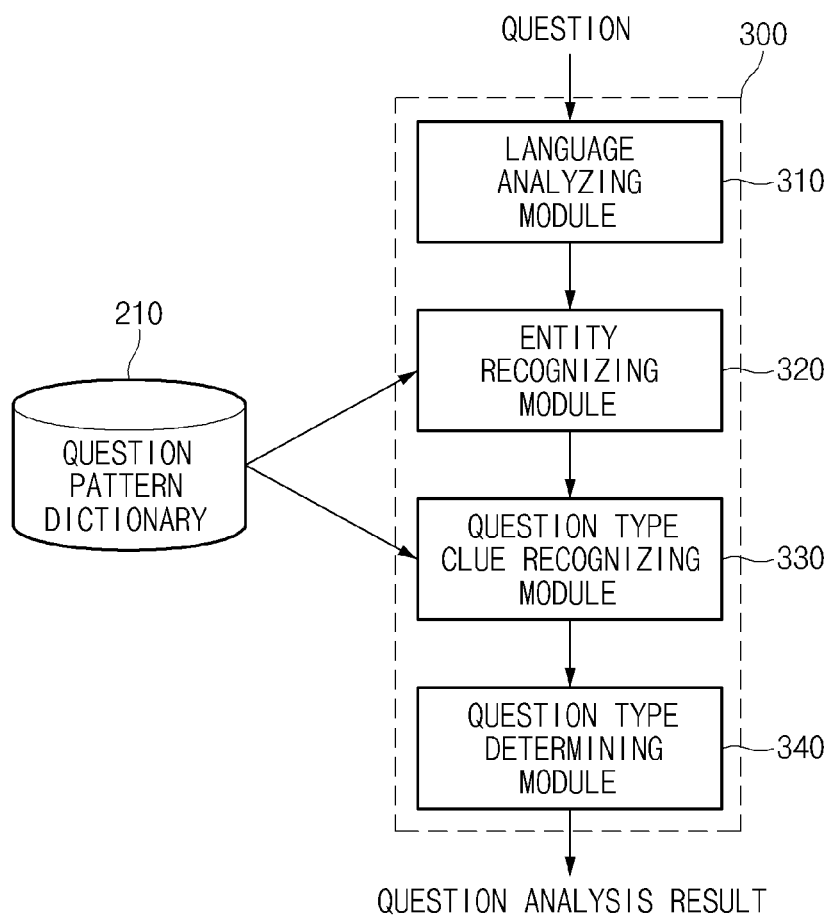
FIG. 6 is a view illustrating a configuration of a question analyzing unit according to an exemplary embodiment of the present invention in more detail.

FIG. 6 is a view illustrating a configuration of a question analyzing unit 300 according to an exemplary embodiment of the present invention in more detail.

Referring to FIG. 6, the question analyzing unit 300 according to the exemplary embodiment of the present invention may include a language analyzing module 310, an entity recognizing module 320, a question type clue recognizing module 330, and a question type determining module 340. The language analyzing module 310 analyzes a language of an input question. The language analysis which is performed by the language analyzing module 310 may include morpheme analysis and entity recognition. The entity recognizing module 320 recognizes a major entity by referring to the question pattern dictionary DB 210 which has been built for the language analyzed result in advance. When there is a plurality of entities, it is important to exactly recognize an entity which is required to be analyzed in the question. For example, when a question is "compare and analyze Galaxy S4 by Samsung to iPhone 5 by Apple", an entity which is recognized by entity name recognition is "Samsung—Organization", "Galaxy S4—Product", "Apple—Organization", and "iPhone 5—Product". However, objects required to be compared and analyzed in the question are "Galaxy S4—Product" and "iPhone 5—Product". As described above, a plurality of various entities appears in the question, the entity recognizing module 320 may use the question pattern dictionary DB 210 in order to select an entity to be compared.

The entity may be classified into categories such as a person, an organization, a product, and a policy. Further, the question may include a clue which requests a specific module result of the social media analysis. In the case of "How's the buzz progress of Samsung Electronics" described above with reference to FIG. 3, the question type clue recognizing module 330 presents only a progress analysis result of the changing buzz among social media analyses of "Samsung Electronics" corresponding to an entity by a clue word of "buzz progress". To this end, the question type clue recognizing module 330 forms a clue word list to previously define clues in the question pattern dictionary DB 210 and performs the question type clue recognition based thereon.

When a type of entity, the number (singular/plural) of entities, and an analysis designation clue word are recognized, the question type determining module 340 may determine a question type based on the recognized clue word. The question type may include various types such as classification of single entity and plural entities, an analysis designation type and a report creation type as described above with reference to FIG. 3.

Figure 7:
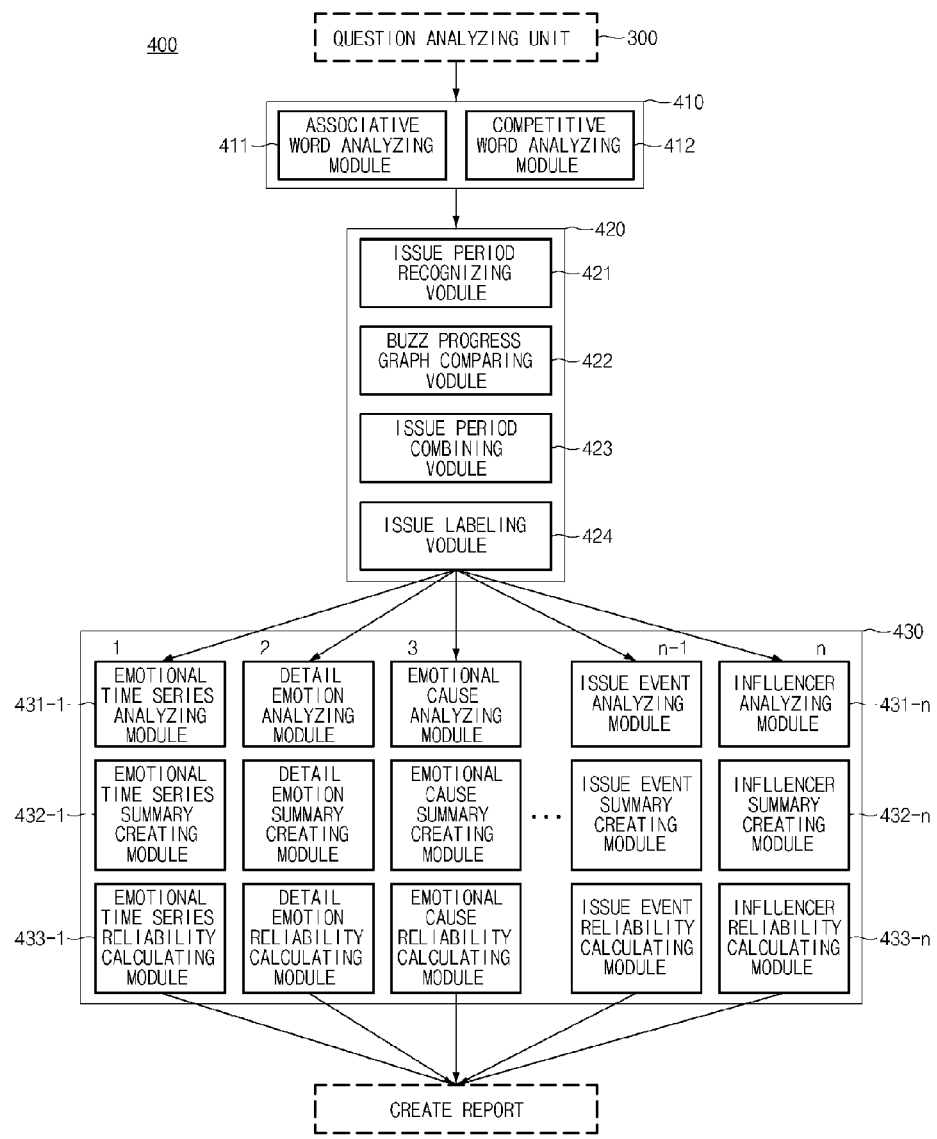
FIG. 7 is a view illustrating a configuration of a social media analyzing unit according to an exemplary embodiment of the present invention in more detail.

FIG. 7 is a view illustrating a configuration of a social media analyzing unit 400 according to an exemplary embodiment of the present invention in more detail.

Referring to FIG. 7, the social media analyzing unit 400 according to the exemplary embodiment of the present invention may include an association/competition analyzing unit 410, an issue processing unit 420, and an individual social media analyzing module 430.

The association/competition analyzing unit 410 may include an associative word analyzing module 411 and a competitive word analyzing module 412. When one entity is recognized, the associative word analyzing module 411 and the competitive word analyzing module 412 analyze an associative word and a competitive word for the entity depending on the result analyzed in the question analyzing unit 330 to select an entity to be compared. The associative word analyzing module 411 analyzes an associative word referring to words which co-occur with the entity in one sentence. The competitive word analyzing module 412 performs competitive word analysis which analyzes entities with a competitive relationship in the sentence. The analyzed associative word and competitive word are arranged in the order of frequencies to be presented. In the meantime, when two or more entities are recognized, the associative word analyzing module 411 and the competitive word analyzing module 412 may not perform the associative word analysis and the competitive word analysis. In this case, the entities which are recognized in the question become comparison targets each other. When entities to be compared are determined, the buzz progress analysis of the entities may be performed by the issue processing unit 420.

The issue processing unit 420 may include an issue period recognizing module 421, a buzz progress graph comparing module 422, an issue period combining module 423, and an issue labeling module 424.

The issue period recognizing module 421 recognizes an issue period based on the entity based buzz progress. The issue period recognizing module 421 may consider an occurrence frequency of the entity by date or a changing progress of the occurrence frequency with previous date in combination for the entity based buzz progress. The issue period recognizing module 421 compares the changing progress for a previous period and a subsequent period in the buzz graph and recognizes a period corresponding to a peak in the graph. That is, the issue period recognizing module 421 may recognize a period when mention of the entity is rapidly increased as compared with the usual. Further, the issue period recognizing module 421 recognizes n (designated by a user) issue periods per entity and ranks the issue periods.

The buzz progress graph comparing module 422 is a module which compares issue periods which are recognized in the plurality of entities. For example, when issue periods of two entities, Samsung Electronics and Apple are recognized and compared, the buzz progress graph comparing module 422 may compare overlapping issue periods related with the two entities or similar patterns of the two entities during the issue period.

The issue period combining module 423 combines overlapping issue periods of the two entities, for example, Samsung Electronics and Apple to present one issue period. For example, when the issue period of the entity, Samsung Electronics, is "Aug. 3, 2013 to Aug. 9, 2013" (seven days) and the issue period of the entity, Apple, is "Aug. 1, 2013 to Aug. 7, 2013" (seven days), an overlapping period is "Aug. 3, 2013 to Aug. 7, 2013" (five days). As described above, when the issue periods between the entities do not exactly match, the issue period combining module 423 may combine the two entities with a common issue period. That is, in the above example, if a range of the issue period is defined as seven days, the issue period combining module 423 may designate "Aug. 2, 2013 to Aug. 7, 2013" (seven days) as a combined issue period of Samsung Electronics and Apple. A more weight is applied to the combined issue period than the issue periods of individual entities so that the combined issue period is reranked.

When one entity is recognized by the question analyzing unit 300, the issue processing unit 420 may compare the buzz progress graph of the entity with the buzz progress graph of the entities to be compared which are presented in the associative word analysis and the competitive word analysis to select one entity having a highest correlation due to the most overlapping issue period and transmit the selection result to the individual social media analyzing module 430.

The issue labeling module 424 is a component which creates issue labels for the issue periods which are recognized in the two entities to be compared. The issue labeling module 424 may analyze a set of sentences including the entity during the issue period to select representative event words and create a natural word label based on the representative event words. When the issue label is presented, an issue summary on a time line per entity may be created. The issue label may be presented at a point corresponding to a peak during the issue period recognized in the individual entity.

The individual social media analyzing module 430 may compare and analyze entities with an issue period corresponding to the first place of the ranking of the issue periods as a default. That is, the individual social media analyzing module 430 may perform detail analysis by applying a zoom-in method to the issue period. To this end, the individual social media analyzing module 430 may include various social media analyzing modules such as an emotional time series analyzing module, a detail emotion analyzing module, an emotional cause analyzing module, an issue event analyzing module, and an influencer analyzing module. Such an individual social media analyzing module 430 may include question type based analyzing modules 431-1 to 431-*n*, question based summary creating modules 432-1 to 432-*n*, and question based reliability calculating modules 433-1 to 433-*n*.

The individual social media analyzing module 430 may concurrently perform the question type based analysis, the question type summary creation, and the question type reliability calculation on the issues. The individual social media analyzing module 430 may provide a reliability value and natural word summary information for the result The reliability value may be presented as a normalized value between 0 to 1 in consideration of a volume of the analyzed social media and accuracy of the analysis result. The reliability value may be used as an important resource to create the summary report. The natural word summary information is information for creating a natural summary of the summary report, in which core contents of the individual social media analysis may be presented together with the information of the variables and the natural word summary in accordance with the frame described above with reference to FIG. 4. The natural word summary is used as a summary of the individual analysis results and the variables are used to create the natural word summary of the summary report.

Figure 8:
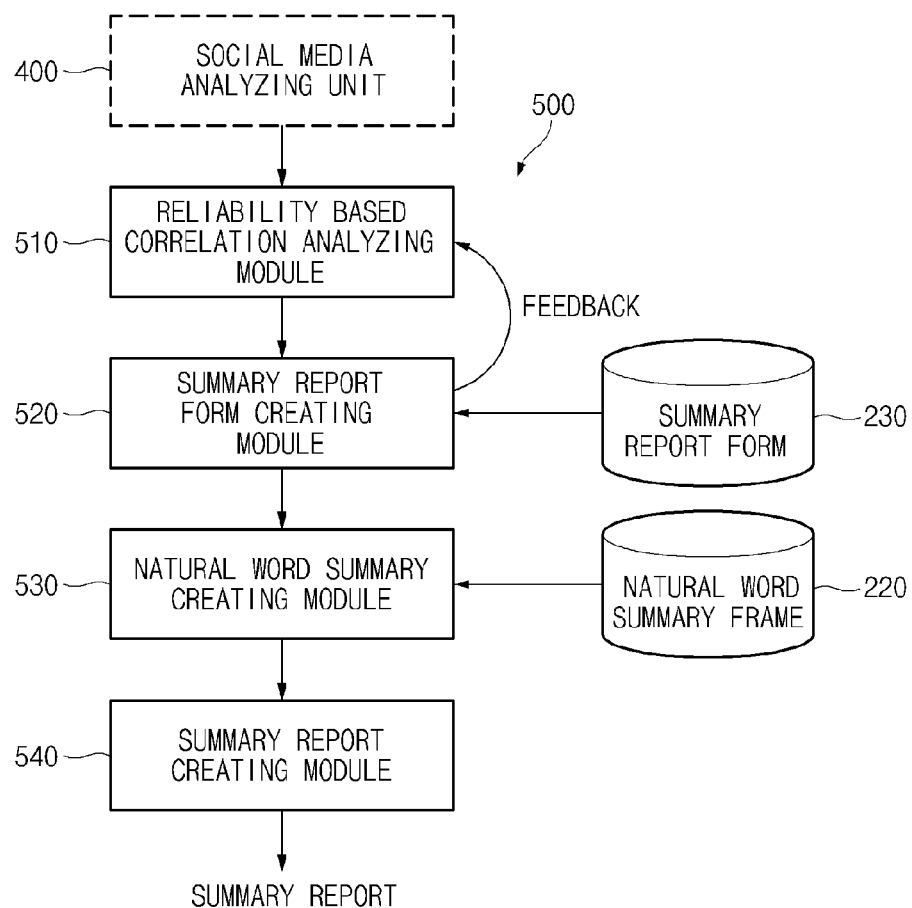
FIG. 8 is a view illustrating a configuration of a report creating unit according to an exemplary embodiment of the present invention in more detail.

FIG. 8 is a view illustrating a configuration of a report creating unit 500 according to an exemplary embodiment of the present invention in more detail.

Referring to FIG. 8, the report creating unit 500 according to the exemplary embodiment of the present invention may include a reliability based correlation analyzing module 510, a summary report form creating module 520, a natural word summary creating module 530, and a summary report creating module 540.

The reliability based correlation analyzing module 510 may use the reliability value which is provided by the individual social media analyzing module 430. The reliability based correlation analyzing module 510 may experimentally or statistically determine a predetermined threshold of the reliability value in accordance with the question based reliability calculation during the individual social media analysis. When the reliability value of the individual result is equal to or higher than the threshold, the reliability based correlation analyzing module 510 includes the result in the summary report, otherwise excludes the result from the summary report. Further, when the result of the individual social media analyzing module 430 is reliable and the results have correlation, the reliability based correlation analyzing module 510 performs the correlation analysis of the individual entities based on the correlation. The correlation analysis between individual results is performed independently on the individual entities to be compared. For example, the reliability based correlation analyzing module 510 may analyze various correlations such as correlation of the emotional time series analysis and an attribute emotion, correlation of the emotional time series analysis and the emotional cause, and correlation of the detail emotion and the emotional cause. The matters related with the correlation analysis will be described below in more detail with reference to FIG. 13.

The summary report form creating module 520 selects the summary report in accordance with a predetermined rule which is defined in advance among summary report forms of DB 230 predefined in accordance the question types and then recreates the summary report form in accordance with the reliability value of the individual analysis results which are presented by the reliability based correlation analyzing module 510. When lots of modules present a reliability value which is lower than the threshold so that the amount of results which are presented in the summary report is small, the reliability value is feedback to the reliability based correlation analyzing module 510 to adjust (lower) the threshold of the individual social media analysis result to repeat a summary report form creating process. In the meantime, when lots of modules present a reliability value which is higher than the threshold so that too many results are presented in the summary report, the reliability value is feedback to the reliability based correlation analyzing module 510 to adjust (increase) the threshold of the individual social media analysis result to repeat a summary report form creating process. To this end, the reliability based correlation analyzing module 510 may have a value in a predetermined range for an amount of results which are presented in the summary report. When the summary report form is finally determined (it is determined whether to arrange and present the individual social media analysis results), the natural word summary creating module 530 creates the natural word summary based on the correlation between individual social media analysis results which are presented in the summary report. The natural word summary creating module 530 uses a natural word summary frame of DB 220 which is created by the resource building unit 100.

The summary report creating module 540 is a module which fills the summary report form determined by the aforementioned module with a question analysis result, individual social media analysis results, and the natural word summary to create a final summary report to be output or transmitted. The created summary report may be presented by various document formats such as PDF or DOC.

In the meantime, a social media issue processing method according to an exemplary embodiment of the present invention by operating the above-described social media issue processing device 10 may include, as the component illustrated in FIG. 1 perform the functions, an inputting step of receiving a question, a step of determining a question type of the input question through a question pattern dictionary which is stored in advance, an analyzing step of performing issue period recognition for the question, question type based analysis, question based summary creation, and question based reliability calculation, and a summarizing step of creating a summary in accordance with at least one correlation of correlation between the question type and the question based summary, correlation between the issue period and the question type based analysis result, and correlation between the reliability and the question based summary. Here, the inputting step may be a step of receiving a natural word question. The analyzing step may include a step of creating a buzz progress graph based on the issue period recognition and a step of automatically comparing individual social media analysis results between entities in the buzz progress graph to understand a similar pattern. The summarizing step may include a step of presenting an insight for the correlation between the entities with a natural word summary.

The analyzing step may further include a step of ranking and presenting the issue periods of the individual entities, a step of receiving an input to select a specific issue period, and a step of presenting an insight for the correlation between the entities through social media detail analysis by a zoom-in method for the issue period selected by the input. Further, the analyzing step may further include a step of automatically creating and attaching an issue label for the issue period.

Figure 9:
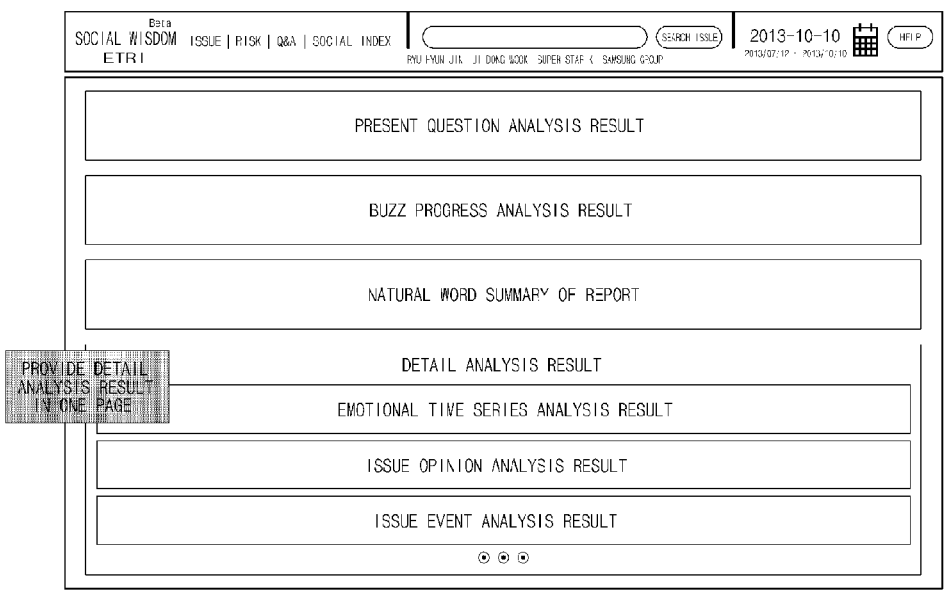
FIGS. 9 and 10 are views illustrating an example of a screen interface related with a social media issue question and answer according to an exemplary embodiment of the present invention.
Figure 10:
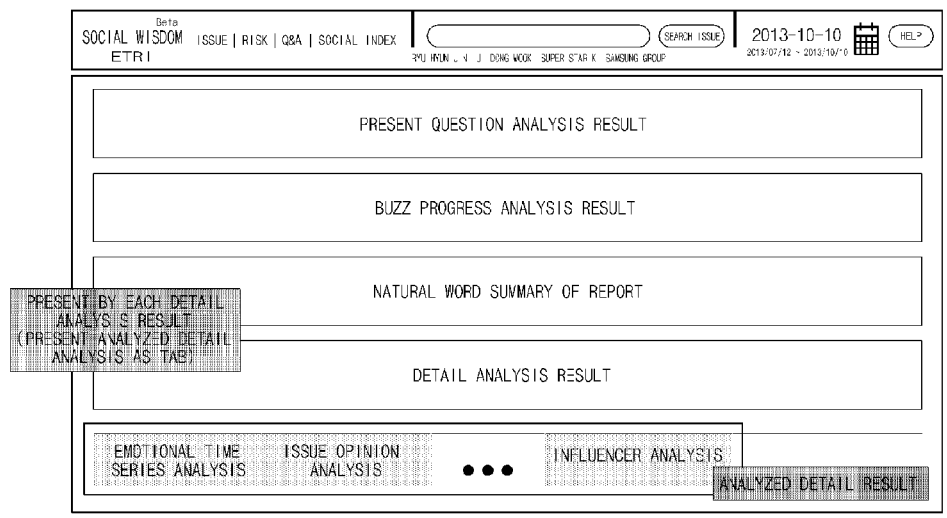

FIGS. 9 and 10 are views illustrating an example of a screen interface related with a social media issue question and answer according to an exemplary embodiment of the present invention.

Referring to FIGS. 9 and 10, on a screen interface, a result of analyzing a question of a user is located on a frame at the top and the buzz progress analysis result and a natural word summary of a report are located next to the frame of the question analysis frame. The individual social media analysis result is located therebelow. Here, the screen interface of FIG. 9 is an example in which the natural word summary and the individual social media analysis result are arranged in one page in accordance with the summary report form. On a screen interface illustrated in FIG. 10, the individual social media analysis result is arranged as a tap in accordance with the summary report form and the analysis result is arranged in the detail analysis result frame in accordance with the selection of the tap. The screen interface may be set such that interaction with the user is allowed only in the question analysis result frame and the buzz progress analysis result frame. Further, the screen interface supports the user to correct the contents of the question analysis result. The screen interface may provide an interface to select ranked issue periods in the buzz progress analysis result frame. To this end, the social media issue processing device 10 may further include a writable display module or an input module.

Figures 11, 12:
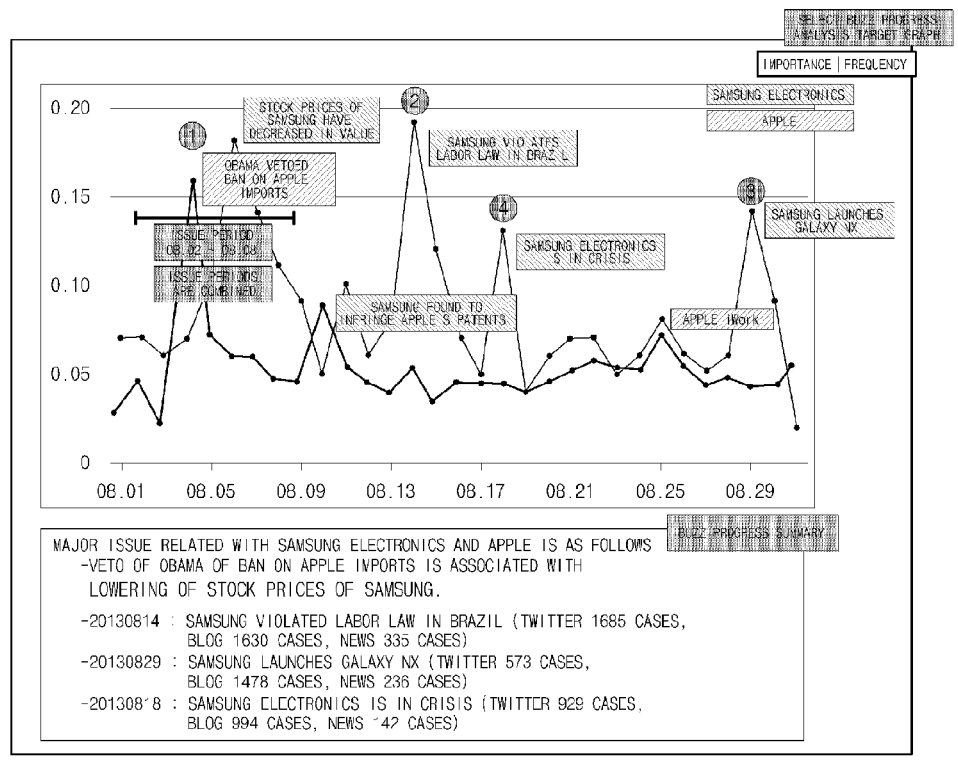
FIG. 11 is a view illustrating an example of a screen interface related with an question analysis result according to an exemplary embodiment of the present invention.
FIG. 12 is a view illustrating an example of a screen interface including a buzz progress analysis graph according to an exemplary embodiment of the present invention.

FIG. 11 is a view illustrating an example of a screen interface related with a question analysis result according to an exemplary embodiment of the present invention.

Referring to FIG. 11, a question analysis result related screen interface may present the analysis results of the natural word question of the user to the user. When the question analysis result related screen interface presents the result, the question analysis related screen interface supports to correct the analyzed result. The question analysis result related screen interface supports to change a recognized entity, a question type, analysis target media, and an analysis period. After correcting the analysis result, when a re-analysis button is clicked, the question analysis result related screen interface may present a corrected question analysis result to reflect the result to an individual social media analysis and support the analysis.

FIG. 12 is a view illustrating an example of a screen interface including a buzz progress analysis graph according to an exemplary embodiment of the present invention.

A buzz progress analysis graph illustrated in FIG. 12 represents a buzz progress analysis when Samsung Electronics and Apple are selected as entities. Referring to FIG. 12, the issue processing unit 420 may recognize issue periods 1, 2, 3, and 4 from a buzz progress comparison graph of Samsung Electronics and Apple and output the issue periods through the screen interface. The issue processing unit 420 may present a label for an issue at a peak of the issue period of the entity based buzz progress graph. The individual social media analyzing module 430 may perform an individual social media detail analysis for the issue period 1 which is the first place among the issue periods 1, 2, 3, and 4 and present the result in accordance with the summary report form. The screen interface including the buzz progress analysis graph may support input event occurrence to request outputting a social media detail analysis result for the issue period 3 among the issue periods 1, 2, 3, and 4. That is, when an event which selects the issue period 3, for example, a click event occurs in the screen interface, the individual social media analyzing module 430 may perform the individual social media detail analysis for the issue period 3 and present a correlation analysis result.

Figure 13A:
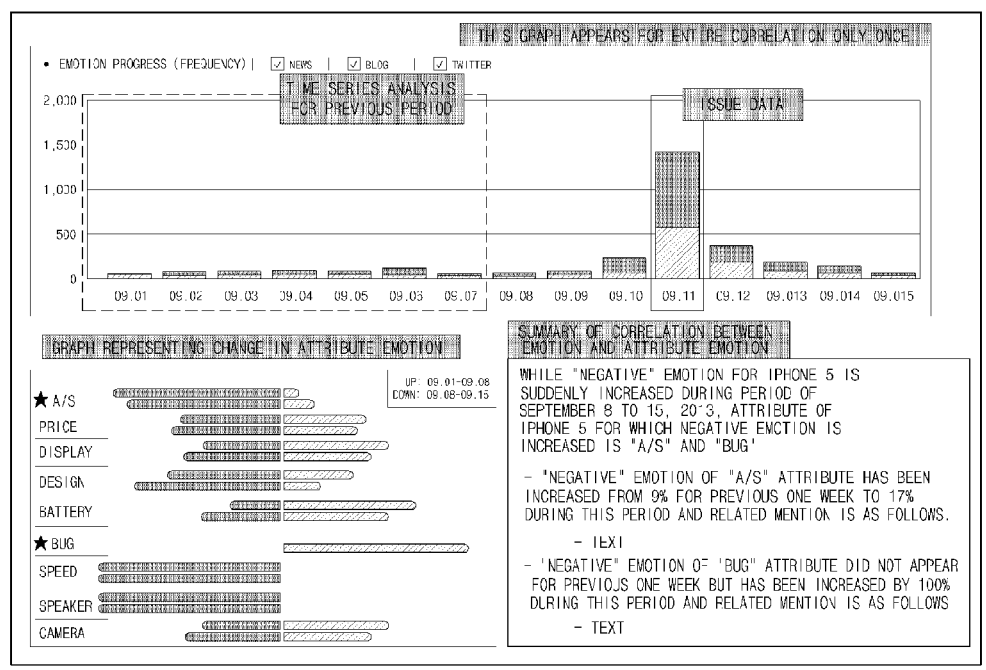
FIGS. 13A to 13C are views illustrating examples of a screen interface including a correlation analysis result between social media analysis results according to an exemplary embodiment of the present invention.
Figure 13B:
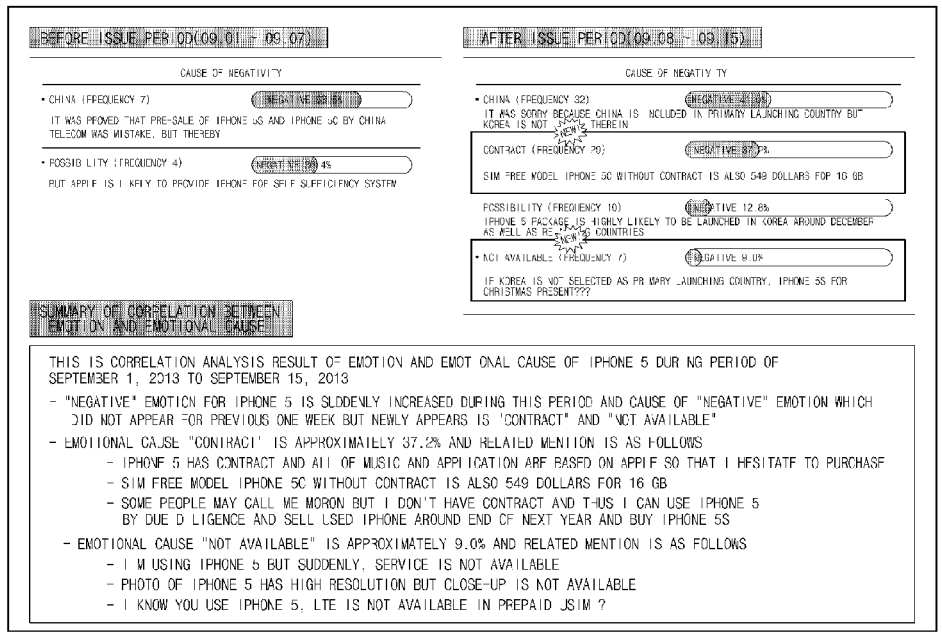
Figure 13C:
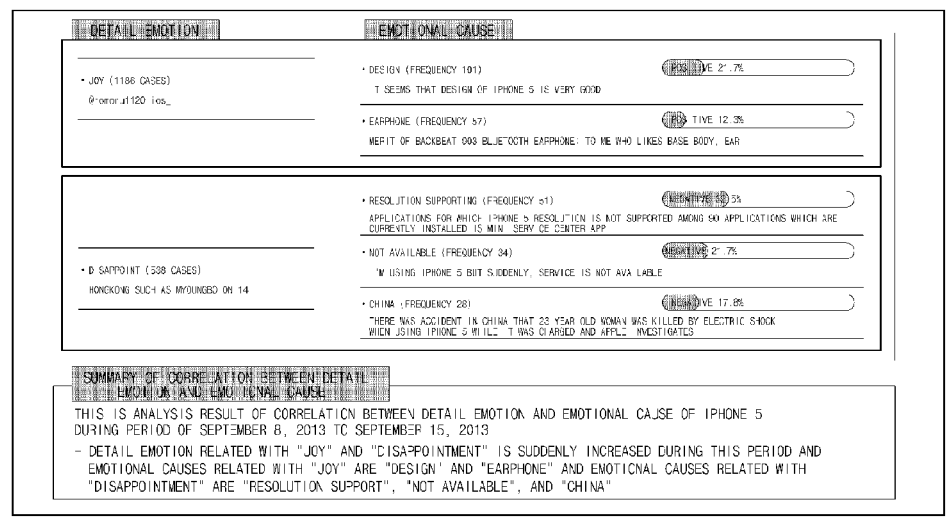

FIGS. 13A to 13C are views illustrating examples of a screen interface including a correlation analysis result between social media analysis results according to an exemplary embodiment of the present invention.

The individual social media analyzing module 430 compares the emotional time series analysis result during the issue period and the emotional time series analysis result before the issue period in the analysis of the correlation between the emotional time series and the attribute emotion to analyze which attribute among attributes of the emotion affects the emotional change. Further, the individual social media analyzing module 430 may distinguish and analyze an emotional change of each attribute which is predefined per domain during an attribute emotion analyzing process. For example, the individual social media analyzing module 430 may define the attributes for a smart phone domain as "A/S", "price", "display", and "design" and present positive or negative emotional information per attribute for the iPhone through the screen interface related with the correlation analysis as illustrated in FIG. 13A. The individual social media analyzing module 430 presents the attribute emotion result by comparing before the issue period and the issue period so as to support to easily understand the attribute emotion change in accordance with the time.

The individual social media analyzing module 430 may compare and analyze the emotional cause before the issue period and the emotional cause during the issue period in the correlation analysis of the emotional time series and the emotional cause. The individual social media analyzing module 430 may perform clustering on sentences corresponding to positivity and negativity in the emotional cause analysis. The individual social media analyzing module 430 provides an issue label to the created cluster to present the cause of the positivity or the negativity by groups. The individual social media analyzing module 430 predefines a major attribute of a specific domain which is designated with regard to the attribute emotion and analyzes the emotion per attribute but creates the label by clustering the positivity or the negativity with regard to the emotional cause, thereby applying the label to various domains.

The individual social media analyzing module 430, as illustrated in FIG. 13B, may put together emotional causes by the same detail emotion with regard to the correlation analysis of the detail emotion and the emotional cause and show the emotional causes. The individual social media analyzing module 430 may classify and analyze a positive emotion and a negative emotion in detail with regard to the detail emotion analysis. For example, the individual social media analyzing module 430 may classify the detail positive emotion into confidence, be impressed, thanks, and expectation and classify the detail negative emotion into fear, angry, and disfavor. The individual social media analyzing module 430, for example, as illustrated in FIG. 13C, categorizes a design and an earphone which are positive emotional causes as joy among the detail emotions, and categorizes resolution support, not available, and China which are negative emotional causes as disappointment among the detail emotions among the emotional cause analysis results for the iPhone 5 during the issue period.

FIGS. 14A to 14I are views illustrating a screen interface of detail analysis results of individual social media according to an exemplary embodiment of the present invention.

The individual social media analyzing module 430 may provide a detail analysis button in the individual social media detail analysis screen interface. The individual social media analyzing module 430 may change contents of the screen to a page through which detail analysis information on the graph is available as the detail analysis button is selected.

Figure 14A:
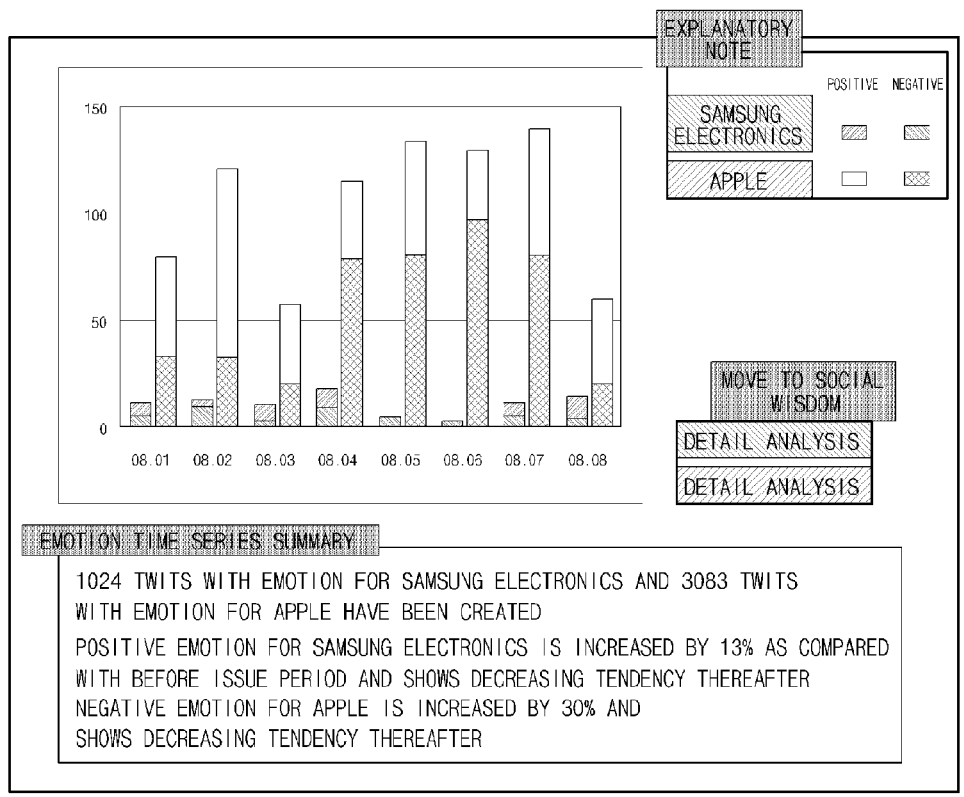
Figure 14B:
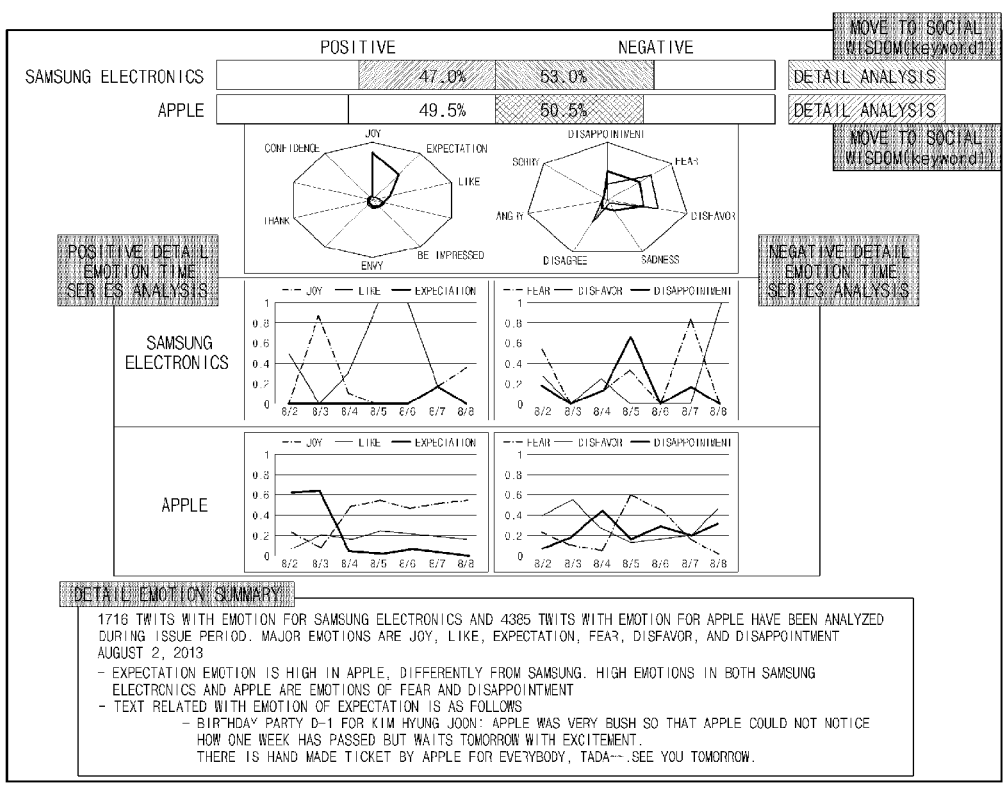
Figure 14C:
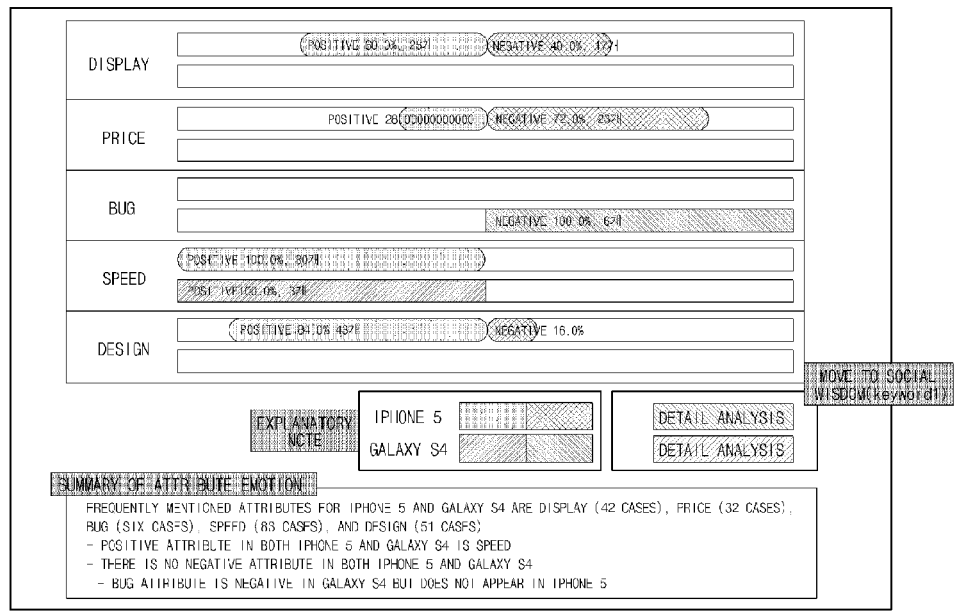
Figure 14D:
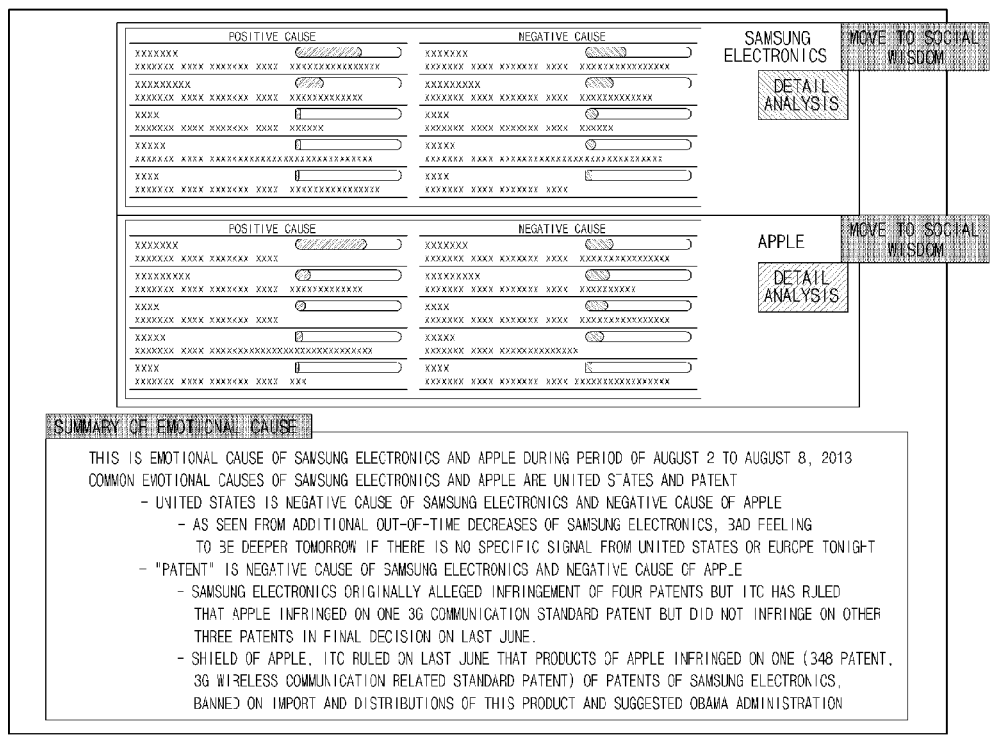
Figure 14E:
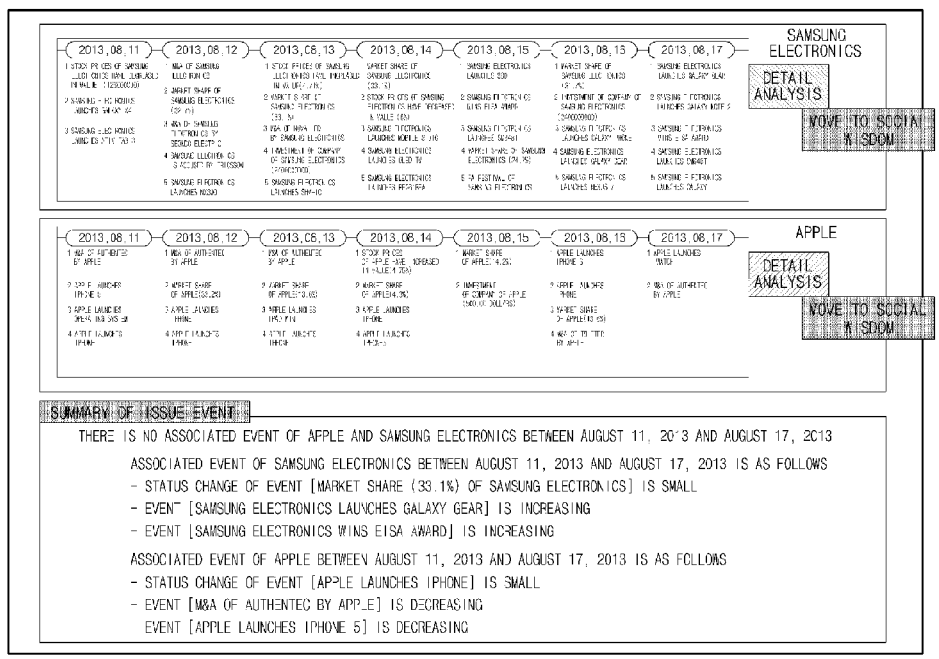
Figure 14F:
Figure 14G:
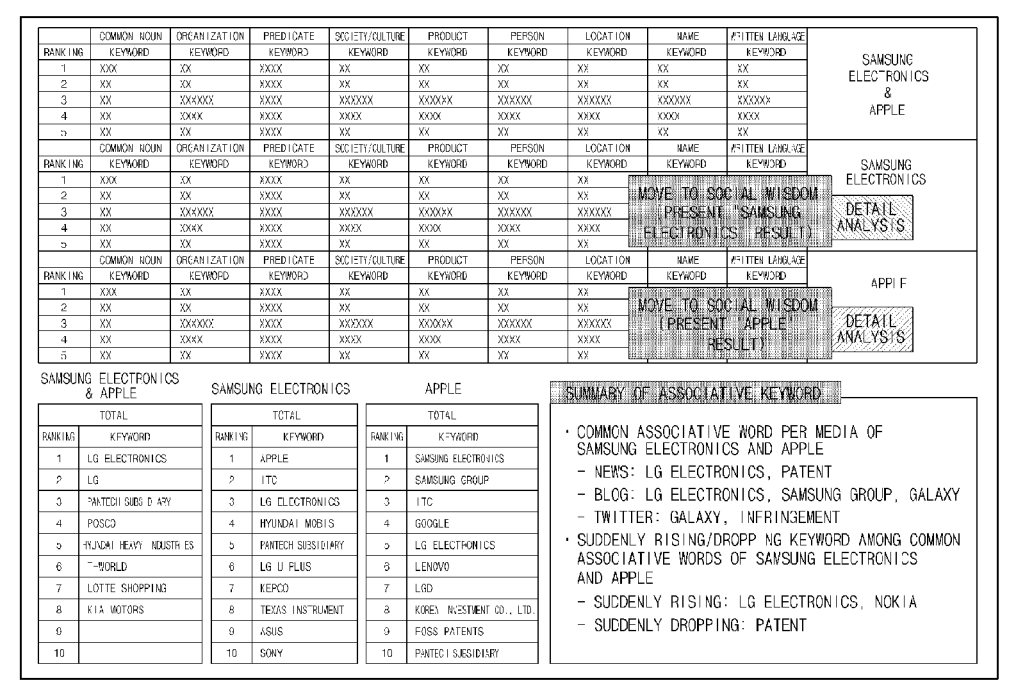
Figure 14I:
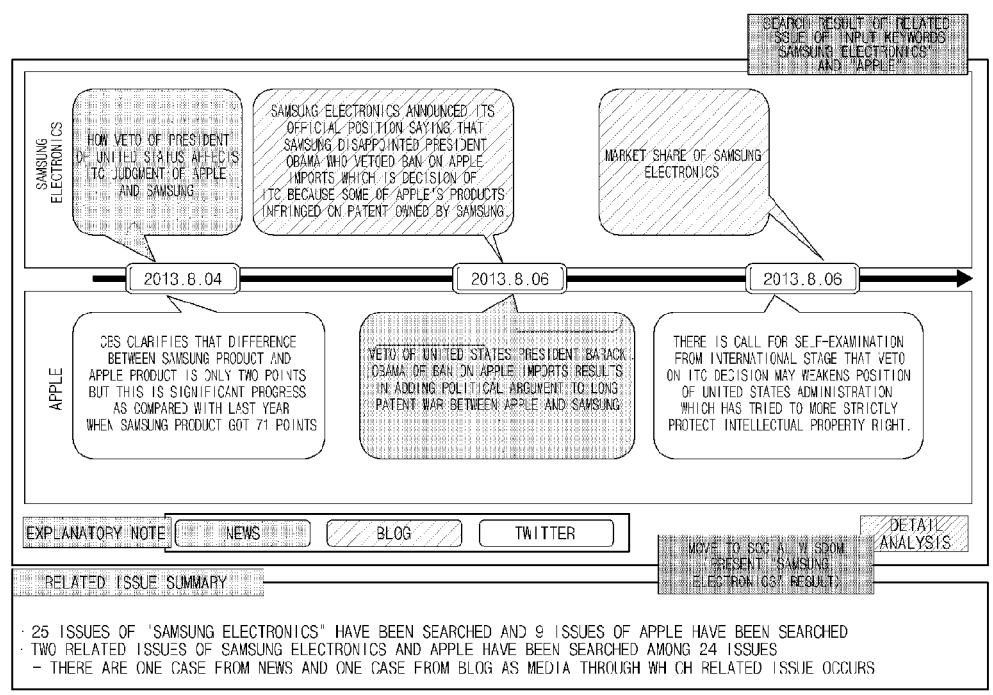

First, FIG. 14A illustrates an emotional time series analysis result of issues whose entities are Samsung Electronics and Apple. FIG. 14B illustrates the detail emotion analysis result and FIG. 14C illustrates an attribute emotion analysis result. FIG. 14D illustrates an emotional cause analysis result, FIG. 14E illustrates an issue event analysis result, and FIG. 14F illustrates an influencer analysis result. Further, FIG. 14G illustrates an associative keyword analysis result, FIG. 14H illustrates a competitive keyword analysis result, and FIG. 14I illustrates a related issue analysis result.

Figure 15:
FIG. 15 is a view illustrating an example of a summary by natural words of a summary report according to an exemplary embodiment of the present invention.

FIG. 15 is a view illustrating an example of a summary by natural words of a summary report according to an exemplary embodiment of the present invention. As illustrated in FIG. 15, the social media issue processing device 10 may provide overall summary information including a question analysis result summary and a detail module analysis result summary for a question detected when the entities are Samsung Electronics and Apple.

Figure 16:
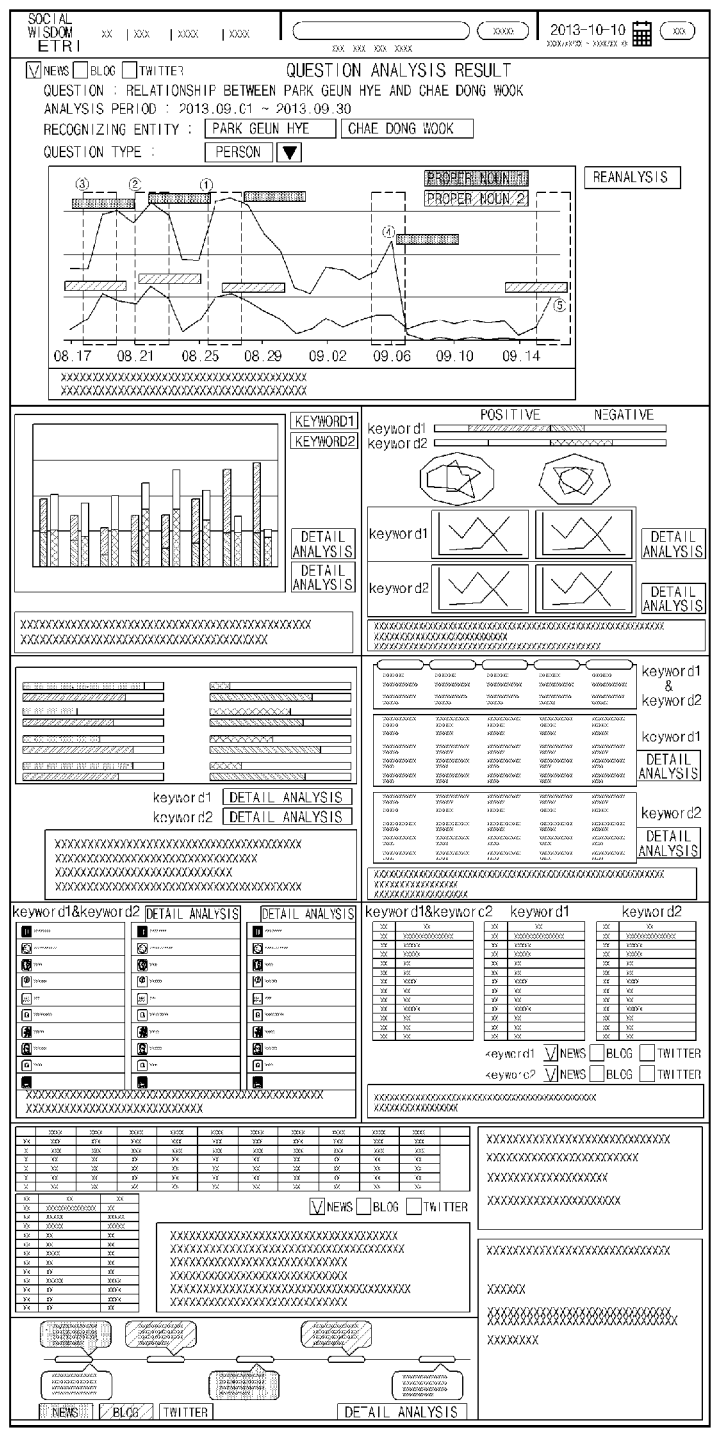
FIG. 16 is a view briefly illustrating a form of a summary report according to an exemplary embodiment of the present invention.

FIG. 16 is a view schematically illustrating a form of a summary report according to an exemplary embodiment of the present invention. Specifically, the social media issue processing device 10 may create the summary report based on the form described with reference to FIG. 9 and provide the summary report as illustrated in FIG. 16.

As described above, the social media issue processing device and method according to the exemplary embodiments of the present invention support to understand a more objective insight based on correlation analysis with respect to the type of question, correlation analysis of the issue period and individual analysis results, and correlation analysis between the individual analysis results and reliability and the issue question and answer report. As described above, according to the exemplary embodiment of the present invention, the summary for the analysis result is automatically created based on three correlations for the question of the user and the report is dynamically created so that objectivity for the answer result may be achieved and the user may obtain an insight based on an objective fact. Further, according to the exemplary embodiment of the present invention, the question type based analysis, the question based summary analysis, and the question based reliability analysis are performed and the summary report may be automatically created and supported based on the results thereof. Further, according to the exemplary embodiment of the present invention, both a keyword search word and a natural word question are provided so as to understand various viewpoints of the user and interaction with the user using a user interface is allowed so as to present a result which satisfies the demand of the user as much as possible. Further, the above-described user interface which may be provided by the social media issue processing device according to the exemplary embodiment of the present invention may be limited by selecting a ranked issue period by correcting the question analysis result and analyzing the buzz progress.

While the exemplary embodiments of the present invention have been described for illustrative purposes, it should be understood by those skilled in the art that various changes, modifications, substitutions, and additions may be made without departing from the spirit and scope of the present invention as defined in the appended claims and such changes and modification belong to the following claims.

What is claimed is:

1. A social media issue processing device, comprising:
 a processor that executes program code stored on computer readable storage medium, the program code comprising:
 question analyzing program code that analyzes a question type related with a question input based on a question pattern dictionary which is stored in advance;
 social media analyzing program code that performs issue period recognition for the question, question type based analysis, question based summary creation, and question based reliability calculation; and
 report creating program code that creates a summary in accordance with at least one of correlation between the question type and the question based summary, correlation between the issue period and a question type based analysis result, and correlation between the reliability and the question based summary.

2. The device of claim 1, further comprising:
 a resource database (DB) that stores the question pattern dictionary, a natural word summary frame, and a summary report form; and
 resource building program code that analyzes at least one of the questions which are collected in advance to build at least one of the question pattern dictionary, the natural word summary frame, and the summary report form.

3. The device of claim 2, wherein the resource building program code includes:
   question type classifying program code that classifies a question type in the questions which are collected in advance; and
   question pattern building program code that detects a predetermined pattern from the classified question type.

4. The device of claim 1, wherein the resource building program code includes:
   entity type classifying program code that classifies an entity type in the questions which are collected in advance; and
   entity based social media detail analyzing program code that analyzes a characteristic in the entity based social media for the classified entity type.

5. The device of claim 1, wherein the question analyzing program code includes:
   language analyzing program code that analyzes a morpheme of the input question and recognizes an entity name;
   entity recognizing program code that recognizes a major entity from the result which is analyzed by the language analyzing program code based on the question pattern dictionary;
   question type clue recognizing program code that recognizes a clue word of the question based on the question pattern dictionary; and
   question type determining program code that determines a question type based on the number of entities and the clue word.

6. The device of claim 1, wherein the social media analyzing program code includes:
   association/competition analyzing program code that analyzes an associative word and a competitive word for the question type which is analyzed by the question analyzing unit;
   issue processing program code that performs an issue period related analysis; and
   individual social media analyzing program code that compares and analyzes entities ranked by a predetermined level during the issue period.

7. The device of claim 6, wherein the issue processing program code includes:
   issue time recognizing program code that recognizes an issue period based on an entity based buzz progress;
   buzz progress graph comparing program code that compares issue periods which are recognized in a plurality of entities;
   issue period combining program code that combines overlapping issue periods of the entities; and
   issue labeling program code that creates an issue label for the issue periods of entities to be compared.

8. The device of claim 1, wherein the report creating program code includes:
   reliability based correlation analyzing program code that analyzes the correlation using the reliability value;
   summary report form creating program code that selects any one of summary report forms which are predefined in accordance with the question type and that recreates a summary report form in accordance with the reliability value;
   natural word summary creating program code that creates a natural word summary based on correlation of the individual social media analysis results which are presented in the summary report; and
   summary report creating program code that creates a summary report by writing a result of the question analyzing program code, the individual social media analysis result, and the natural word summary in the summary report form.

9. The device of claim 1, further comprising: display program code or input program code that supports an input function to request at least one of the issue period selection and the question analysis result correction.

10. A social media issue processing method, comprising:
    an inputting step of receiving a question;
    a step of determining a question type of the input question through a question pattern dictionary which is stored in advance; an analyzing step of performing issue period recognition for the question, question type based analysis, question based summary creation, and question based reliability calculation; and
    a summarizing step of creating a summary in accordance with at least one of the correlation between the question type and the question based summary, correlation between the issue period and a question type based analysis result, and correlation between the reliability and the question based summary.

11. The method of claim 10, wherein the inputting step is a step of receiving a natural word question.

12. The method of claim 10, wherein the analyzing step includes:
    a step of creating a buzz progress graph based on the issue period recognition; and
    a step of automatically comparing individual social media analysis results between entities in the buzz progress graph to understand a similar pattern.

13. The method of claim 12, wherein the analyzing step further includes:
    a step of ranking and presenting the issue periods of individual entities;
    a step of receiving an input to select a specific issue period; and
    a step of presenting an insight for the correlation between the entities through social media detail analysis by a zoom-in method for an issue period selected by the input.

14. The method of claim 12, wherein the analyzing step further includes: automatically creating and attaching an issue label for the issue period.

15. The method of claim 10, wherein the summarizing step includes: a step of presenting an insight for the correlation between the entities as a natural word summary.

* * * * *